US011321819B2

(12) United States Patent
Balasubramaniyan et al.

(10) Patent No.: US 11,321,819 B2
(45) Date of Patent: May 3, 2022

(54) SYSTEM AND METHOD FOR PERFORMING A CONVOLUTION OPERATION

(71) Applicant: HCL TECHNOLOGIES LIMITED, Uttar Pradesh (IN)

(72) Inventors: Prasanna Venkatesh Balasubramaniyan, Chennai (IN); Sainarayanan Gopalakrishnan, Chennai (IN); Gunamani Rajagopal, Chennai (IN)

(73) Assignee: HCL TECHNOLOGIES LIMITED, Noida (IN)

( * ) Notice: Subject to any disclaimer, the term of this patent is extended or adjusted under 35 U.S.C. 154(b) by 0 days.

(21) Appl. No.: 16/721,793

(22) Filed: Dec. 19, 2019

(65) Prior Publication Data

US 2020/0219239 A1 Jul. 9, 2020

(30) Foreign Application Priority Data

Jan. 7, 2019 (IN) .............................. 201911000738

(51) Int. Cl.
*G06T 5/20* (2006.01)
(52) U.S. Cl.
CPC ...... *G06T 5/20* (2013.01); *G06T 2207/20084* (2013.01)
(58) Field of Classification Search
None
See application file for complete search history.

(56) References Cited

U.S. PATENT DOCUMENTS

| 8,442,927 | B2 | 5/2013 | Cadambi et al. |
| 9,391,621 | B2 | 7/2016 | Tahiri et al. |
| 9,978,014 | B2 | 5/2018 | Falcon et al. |
| 10,614,148 | B2 * | 4/2020 | Balasubramaniyan ... G06T 5/10 |
| 2011/0029471 | A1 * | 2/2011 | Chakradhar ........... G06N 3/063 706/25 |
| 2018/0032857 | A1 * | 2/2018 | Lele ......................... G06N 3/04 |

(Continued)

FOREIGN PATENT DOCUMENTS

| CN | 203966104 U | 11/2014 |
| KR | 1020180036587 A | 4/2018 |

OTHER PUBLICATIONS

Ma, Yufei. Hardware Acceleration of Deep Convolutional Neural Networks on FPGA. Diss. Arizona State University, 2018. (Year: 2018).*

*Primary Examiner* — Andrae S Allison
(74) *Attorney, Agent, or Firm* — Kendal Sheets (57) ABSTRACT

A Convolution Multiply and Accumulate (CMAC) system for performing a convolution operation is disclosed. The CMAC system receives image data pertaining to an image. The image data comprises a set of feature matrix, a kernel size and depth information. Further, the CMAC system generates a convoluted data based on convolution operation for each feature matrix. The CMAC system performs an accumulation of the convoluted data to generate accumulated data, when the convolution operation for each feature matrix is performed. The CMAC system further performs an addition of a predefined value to the accumulated data to generate added data. Further, the CMAC system filters the added data to provide a convolution result for the image, thereby performing the convolution operation of the image.

13 Claims, 3 Drawing Sheets

(56) References Cited

U.S. PATENT DOCUMENTS

| | | |
|---|---|---|
| 2018/0089146 A1* | 3/2018 | Hu .......................... G06F 17/14 |
| 2018/0137406 A1* | 5/2018 | Howard ................. G06N 3/082 |
| 2018/0173571 A1* | 6/2018 | Huang ................... G06N 3/063 |
| 2018/0173676 A1* | 6/2018 | Tsai ........................ G06F 17/16 |
| 2018/0189641 A1 | 7/2018 | Boesch et al. |
| 2019/0026078 A1* | 1/2019 | Bannon ................. G06F 7/5443 |
| 2019/0114532 A1* | 4/2019 | Sunwoo .................... G06T 5/00 |
| 2020/0218917 A1* | 7/2020 | Balasubramaniyan ...................... G06F 17/153 |
| 2020/0225947 A1* | 7/2020 | Nagi ..................... G06F 7/4806 |

\* cited by examiner

Figure 3

SYSTEM AND METHOD FOR PERFORMING A CONVOLUTION OPERATION

CROSS-REFERENCE TO RELATED APPLICATIONS AND PRIORITY

The present application claims benefit from Indian Complete Patent Application No. 201911000738 filed on 7 Jan. 2019 the entirety of which is hereby incorporated by reference.

TECHNICAL FIELD

The present subject matter described herein, in general, relates to performing a convolution operation and more particularly to performing the convolution operation by using a Convolution Multiply and Accumulate (CMAC).

BACKGROUND

In recent times, Convolution Neural Network (CNN) technique is used for multiple applications in computer vision. The computer vision is used to detect a scene or an object in real time from an image captured in a system. In order to detect the object in real time, complex computations need to be performed by the system. It becomes difficult for the system to perform the computations due to limits of available on-chip resources. It is to be noted that hardware capabilities of the one or more available on-chip resources cannot be extended in real time. Thus, there is a need of fully configurable and low level complex processing elements to perform computation according to computation demand and the on-chip resource availability.

Further, the conventional systems and methodologies use different systems to perform computation on a 2-Dimensional image and a 3-Dimensional image. It is to be noted that different type of system needs to be implemented to perform the computation on the 2-Dimensional image and the 3-Dimensional image. Thus, there is a need of system that can be used to perform the computation for the 2-Dimensional image and the 3-Dimensional image based on the computation demand.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for performing a convolution operation and the concepts are further described below in the detailed description. This summary is not intended to identify essential features of the claimed subject matter nor is it intended for use in determining or limiting the scope of the claimed subject matter.

In one implementation, a Convolution Multiply and Accumulate (CMAC) system for performing a convolution operation is disclosed. The CMAC system may comprise a local controller configured to generate a set of signals comprising a first signal, a second signal, a third signal and a fourth signal. The set of signals may be generated upon receipt of image data pertaining to an image. The image data may comprise a set of feature matrix, depth information and a kernel size. The CMAC system further comprises a Multiply and Accumulate (MAC) configured to generate convoluted data by performing a convolution operation on each feature matrix upon receipt of the first signal. The convolution operation may be performed by multiplication of each feature, from the feature matrix, with the depth information. Further, the CMAC system comprises an accumulator configured to generate accumulated data based on accumulation of the convoluted data, when the convolution operation for each feature matrix is performed. The accumulator may accumulate the convoluted data upon receipt of the second signal. Furthermore, the CMAC system may comprise an adder. configured to generate added data based on addition of a predefined value to the accumulated data upon receipt of the third signal. The CMAC system may further comprise an activation block configured to filter the added data in order to provide a convolution result for the image. The activation block filters the added data using a filter function upon receipt of the fourth signal.

In another implementation, a method for performing convolution operation is illustrated. The method may comprise receiving image data associated with an image. The image data may comprise a set of feature matrix, a kernel size, and depth information. Further, the method may comprise generating convoluted data based on execution of convolution operation for each feature matrix. The convolution operation may be executed by multiplication of each feature, from the feature matrix, with the depth information. The method may comprise performing an accumulation of the convoluted data to generate accumulated data, when the convolution operation for each feature matrix is performed. The method may comprise performing an addition of a predefined value to the accumulated data. The addition may be performed to generate added data. Further, the method may comprise filtering the added data by using a filter function configured to provide a convolution result for the image, thereby performing the convolution operation on the image.

In yet another implementation, non-transitory computer readable medium embodying a program executable in a computing device for performing a convolution operation is disclosed. The program may comprise a program code for receiving image data associated with an image. The image data may comprise a set of feature matrix, a kernel size, and depth information. Further, the program may comprise a program code for generating convoluted data based on execution of convolution operation for each feature matrix. The convolution operation may be executed by multiplication of each feature, from the feature matrix, with the depth information. The program may further comprise a program code for performing an accumulation of the convoluted data to generate accumulated data, when the convolution operation for each feature matrix is performed. The program may comprise a program code for performing an addition of a predefined value to the accumulated data. The addition may be performed to generate added data. Further, the program may comprise a program code for filtering the added data by using a filter function configured to provide a convolution result for the image, thereby performing the convolution operation on the image

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "receiving," "generating," "performing," "executing," "adding," and "filtering," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention may perform a convolution operation on an image using a Convolution Multiply and Accumulate (CMAC) system. It is to be noted that the CMAC system may utilize already available on-chip resources of at least Field Programmable Gate Arrays (FPGA) and Application Specific Integrated Circuits (ASIC). Example of the on-chip resources include, but not limited to, registers, Digital Signal Processing (DSP) chips, memory controllers, multipliers, multiplexers, and adders. It is to be noted that the CMAC system may adapt various versions of kernel sizes including, but not limited to, 3×3, 5×5, 7×7, 9×9, and N×N.

In order to perform the convolution operation on the image, initially, image data pertaining to an image may be received. The image data may comprise a set of feature matrix, a kernel size, and depth information. In an implementation, the image may comprise a set of layers. Each layer may be used for convolution operation of the image. Further, one layer may comprise different kernel size than another layer. Upon receipt of the image data, the convolution operation may be performed for each feature matrix to generate convoluted data. The convolution operation may be performed by multiplication of each feature, from the feature matrix, with the depth information. Once the convoluted data for each feature matrix is generated, the convoluted data may be accumulated to generate the accumulated data. Further, a predefined value may be added to the accumulated data to generate added data. Upon addition of the predefined value, the added data may be filtered using a filter function to provide a convolution result for the image.

Figure 1:
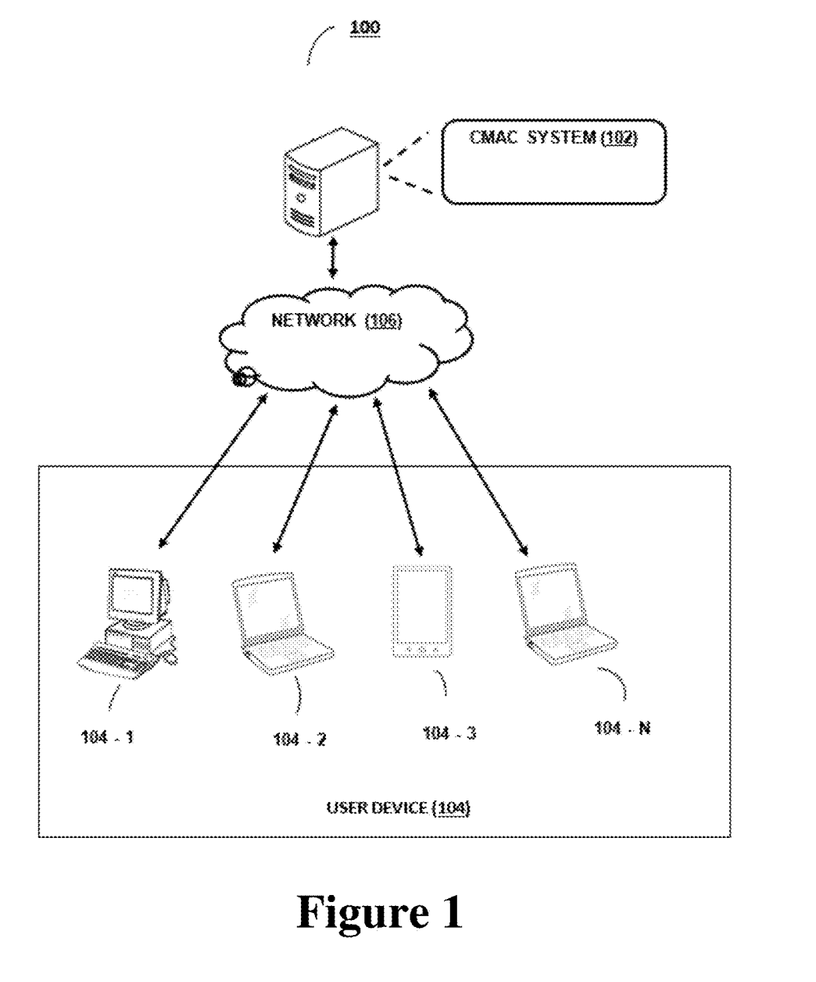
FIG. 1 illustrates a network implementation of a Convolution Multiply and Accumulate (CMAC) system for performing a convolution operation, in accordance with an embodiment of the present subject matter.

Referring now to FIG. 1, a network implementation 100 of a Convolution Multiply and Accumulate (CMAC) system 102 for performing a convolution operation is disclosed. Although the present subject matter is explained considering that the CMAC system 102 is implemented on a server, it may be understood that the CMAC system 102 may also be implemented in a variety of computing systems, such as a laptop computer, a desktop computer, a notebook, a workstation, a mainframe computer, a server, a network server, and the like. In one implementation, the CMAC system 102 may be implemented over a cloud network. Further, it will be understood that the CMAC system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the CMAC system 102 may receive image data pertaining to an image. The image data may comprise a set of matrix, a kernel size and depth information. Upon receiving the image data, the CMAC system 102 may generate a set of signals. The set of signals may comprise a first signal, a second signal, a third signal and a fourth signal.

Further, the CMAC system 102 may perform a convolution operation each feature matrix to generate convoluted data. The convolution operation may be performed based on multiplication of each feature, from the feature matrix, with the depth information. Once the convoluted data is generated, the CMAC system 102 may accumulate the convoluted data, when the convolution operation on each feature matrix is performed. Based on the accumulation of the convoluted data, accumulated data may be generated.

Further, the CMAC system 102 may add a predefined value to the accumulated data. Upon addition of the predefined value to the accumulated data, added data may be generated. The CMAC system 102 may further filter the added data using a filter function. Based on filtering the added data, the CMAC system 102 may provide a convoluted result of the image.

Figure 2:
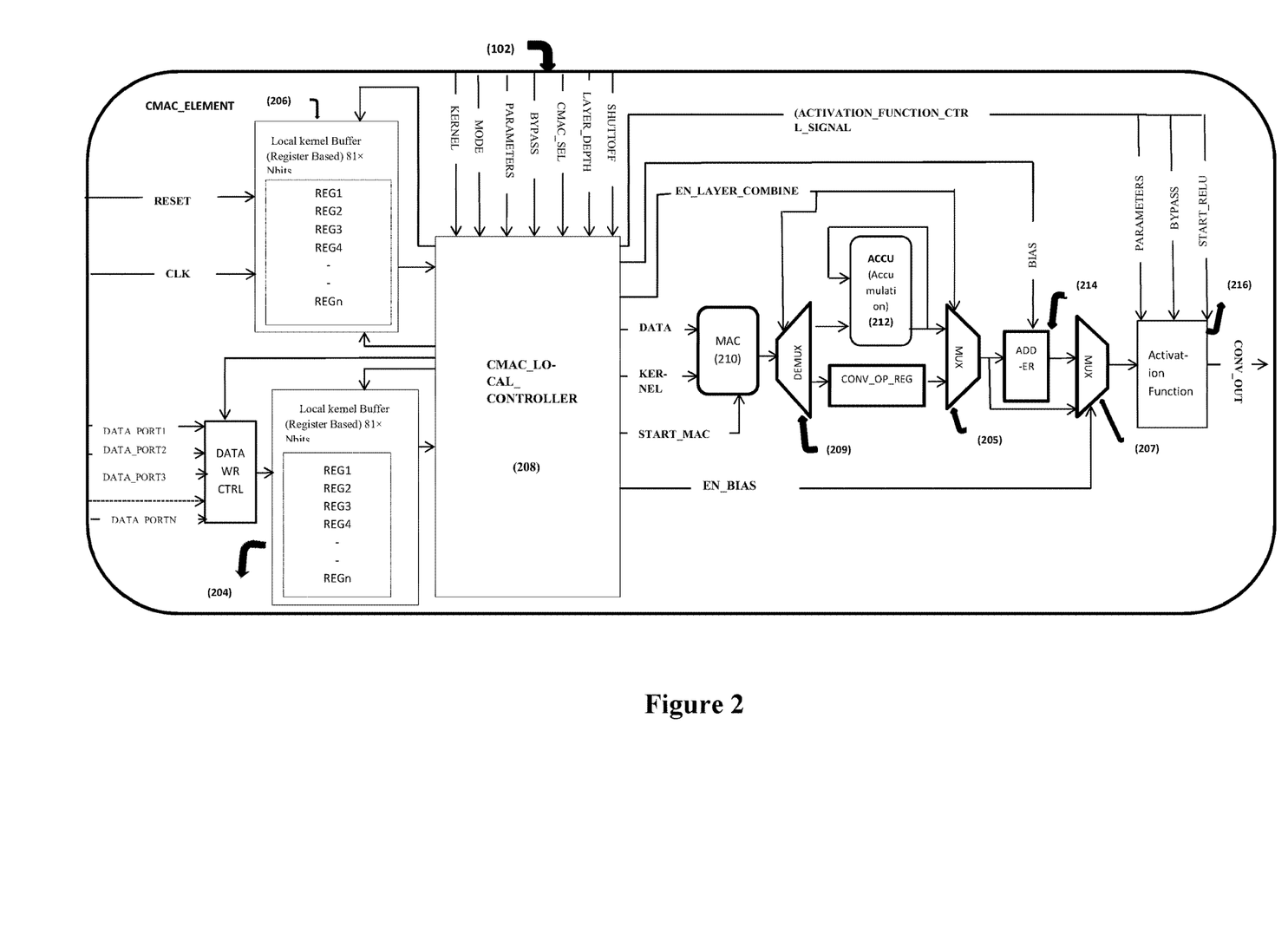
FIG. 2 illustrates a hardware implementation of a Convolution Multiply and Accumulate for performing convolution operation, in accordance with an embodiment of the present subject matter.

Referring now to FIG. 2, a hardware implementation of a Convolution Multiply and Accumulate (CMAC) system 102 for performing convolution operation is disclosed. The CMAC system 102 may comprise a local pixel buffer 204, a local kernel buffer 206, a local controller 208, a Multiply and Accumulate (MAC) function 210, an accumulator 212, an adder 214, and an activation block 216. Further, the CMAC system 102 may comprise multiple data ports configured to load data concurrently into the local pixel buffer 204. Example of the multiple data ports comprise DATA_PORT1, DATA_PORT2, DATA_PORT3 and the like.

The CMAC system 102 may be implemented using one of Field Programmable Gate Arrays (FPGA), Application Specific Integrated Circuits (ASIC) or Graphical Processing Unit (GPU). The on-chip resources may comprise a multiplexer-1 referred as Mux-1 205, a multiplexer-2 referred as Mux-2 207, and a demultiplexer referred as Demux 209.

It is to be understood that a user may interact with the CMAC system 102 via an interface. The interface may include a variety of software and hardware interfaces, for example, a web interface, a graphical user interface, and the like. The interface may allow the CMAC to interact with the user directly or through other client devices. Further, the interface may enable the CMAC system 102 to communicate with other computing devices, such as web servers and external data servers (not shown). The interface may facilitate multiple communications within a wide variety of networks and protocol types, including wired networks, for example, LAN, cable, etc., and wireless networks, such as WLAN, cellular, or satellite. The interface may include one or more ports for connecting a number of devices to one another or to another server. In an implementation, the interface may facilitate on-chip communication by implementing on-chip bus protocols including, but not limited to, Advanced Microcontroller Bus Architecture (AMBA) Advanced High-Performance bus (AHB) and Advanced Extensible Interface (AXI), Wishbone Bus, Open Core Protocol (OCP) and Core Connect Bus. In other implementation, the interface may facilitate off-chip communication by implementing off-chip bus protocols including, but not limited to, Universal Serial Bus (USB), Peripheral Component Interconnect Express (PCIe), and High speed interfaces.

The local controller 208 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one aspect, the local controller 208 may include routines, programs, objects, components, data structures, etc., which perform particular tasks or implement particular abstract data types.

Further, the local controller 208 may further be connected to the local pixel buffer 204 and the local kernel buffer 206. The local controller 208 may store kernel data associated with the image in the local kernel buffer 206. Further, the local controller 208 may store pixel data of the image in the local pixel buffer 204. The local pixel buffer 204 may receive the pixel data via multiple data ports that are configured to load data concurrently.

In one embodiment, the local controller 208 may receive the image data pertaining to the image. The image data may comprise a set of filter matrix, a kernel size, and depth information. The local controller 208 may receive the kernel size via a kernel signal. The local controller 208 may receive the depth information via a LAYER_DEPTH signal. Further, the local controller 208 may store the kernel size in the local kernel buffer 206, and the set of feature matrix in the local pixel buffer 204.

In one aspect, size of the local pixel buffer 204 and the local kernel buffer 206 may be based on the kernel size. The local pixel buffer 204 and the local kernel buffer 206 may comprise a set of registers to store the set of feature matrix and the kernel size. In one example, if the kernel size is 9×9, then the size of the local pixel buffer 204 and the local kernel buffer 206 may comprise 81 register locations.

Upon receipt of the image data, the local controller 208 may generate a set of signals. The set of signals may comprise a first signal, a second signal, a third signal, a fourth signal and the like. The first signal may be a START_MAC signal to perform the convolution operation. The second signal may be a EN_LAYER_COMBINE signal to accumulate convoluted data. The third signal may be a BIAS signal to add a predefined value to the accumulated data. The fourth signal may be a ACTIVATION_FUNCTION_CTRL_SIGNAL to filter added data. Further, the local controller 208 may provide a MODE signal to the MAC function 210. The MODE signal may indicate kernel size for the convolution operation.

Further, the local controller 208 may be connected to the MAC function 210. In one aspect, the MAC function 210 may receive the set of feature matrix, the depth information from the local controller 208 via data signal. Further, the MAC function 210 may receive the kernel size from the local controller 208 via a kernel signal. The MAC function 210 may further receive the MODE signal from the local controller 208. The MODE signal 208 may indicate the kernel size associated with a particular layer from the set of layers. Further, the MAC function 210 may receive a START_MAC signal, from the local controller, to start the convolution operation. Upon receiving the START_MAC signal, the MAC function 210 may be configured to perform the convolution operation for each feature matrix.

In one embodiment, the MAC function 210 may be configured to generate the convoluted data based on the convolution operation. The convolution operation may be performed by multiplication of each feature, from the feature matrix, with the depth information. In one example, the convolution operation may be performed for each layer of the image.

The MAC function 210 may be further connected to the accumulator via the Demux 209. In one aspect, the Demux 209 may receive an input signal from the MAC function 210 and generate two output signals based on receiving the EN_LAYER_COMBINE signal from the local controller 208. Further, one output signal of the Demux 209 may be connected to the accumulator 212, and another output signal of the Demux 209 may be connected to the Mux-1 205 via CONV_OP_REG signal.

Once the convoluted data is generated, the accumulator 212 may perform accumulation of the convoluted data, when the convolution operation for each feature matrix is performed. In one aspect, the accumulation may be performed by combining the convoluted data associated with each layer from the set of layers. The accumulator 212 may perform the accumulation upon receiving the EN_LAYER_COMBINE signal from the local controller 208. The EN_LAYER_COMBINE signal may instruct to perform accumulation of the convoluted data. In one aspect, the local controller 208 may disable the EN_LAYER_COMBINE signal.

In one aspect, the accumulation may be performed, when the convolution operation is the 3-Dimensional convolution operation. This is because, in the 3-Dimensional convolution operation, multiple features need to be convoluted. In another aspect, the accumulation may be disabled, when the convolution operation is the 2-Dimensional operation. This is because, in the 2-Dimensional convolution operation, single feature needs to be convoluted.

In one example, construe the kernel size of the image 3×3. In this case, the convoluted data may be moved to the accumulator 212 at the end of $9^{th}$ iteration. In other words, the accumulation of the convoluted data may be performed, when the Demux 209 selects the output signal connected to the accumulator 212 upon receiving the EN_LAYER_COMBINE signal. It is to be noted that the EN_LAYER_COMBINE signal may be enabled, when the 3-Dimensional convolution operation is to be performed.

In one embodiment, the Demux 209 may select the other output signal connected to the Mux-1 205. The other output signal may be selected, when the 2-Dimensional convolution is to be performed. In one aspect, the Mux-1 205 may receive two input signals such as one input signal from an output of the accumulator 212, and other output signal from the Demux 209.

Further, the Mux-1 205 may be connected to the adder 214. Once the accumulated data is generated, the adder 214 may add a predefined value to the accumulated data to generate the added data. The adder 214 may add the predefined value upon receiving the BIAS signal from the local controller 208. The BIAS signal may instruct to add the predefined value to the added data. In other words, the BIAS signal may be added to the accumulated data at the adder 214. In one aspect, the local controller 208 may disable the BIAS signal.

The adder 214 may be further connected to a Mux-2 207. The Mux-2 207 may receive an EN_BIAS signal from the local controller 208. The EN_BIAS signal may bypass the MAC element 210, the accumulator 212 and the adder 214. The Mux-2 207 may receive one input signal from an output of the adder 214 and other input signal from the output of the Mux-1 205. Further, an output of the Mux-2 207 may be connected to the activation block 216.

Further, the activation block 216 may filter the added data upon receiving the ACTIVATION_FUNCTION_CTRL_SIGNAL from the local controller 208. The added data may be filtered using a filter function to provide a convolution result for the image. Example of the filter function include, but not limited to, a Rectified Linear Unit (ReLU), Sigmoid or Logistic, and Hyperbolic tangent function-Tanh. Further, an output of the activation block 216 may be CONV_OUT signal indicating the convoluted result for the image.

In one embodiment, the ACTIVATION_FUNCTION_CTRL_SIGNAL may be one of a PARAMETERS signal, a BYPASS signal or a START_RELU signal. The activation block 216 may receive a set of parameters from the local controller 208 from the PARAMETERS signal. The set of parameters may be used for filtering the added data. Further, the activation block 216 may receive the BYPASS signal to bypass the MAC element 210, the accumulator 212 and the adder 214. The activation block 216 may receive the filter function via the START_RELU signal. In one aspect, the local controller 208 may disable the ACTIVATION_FUNCTION_CTRL_SIGNAL.

It is to be noted that the convoluted result for the image may be generated utilizing the MAC function 210, the accumulator 212, the adder 214 and the activation block 216.

In one embodiment, the CMAC system 102 may be shut off based on receiving a SHUTOFF signal from the local controller 208. The SHUTOFF signal may indicate a turn off command. In one aspect, when the CMAC system 102 is implemented on the FPGA, during the shut-off scenario, the clock to the CMAC system 102 may be turned off. In another aspect, when the CMAC system 102 is implemented on the ASIC, during the shut-off scenario, the clock and the power to the CMAC system 102 may be turned off.

It is to be noted that multiple CMAC systems may be implemented to perform parallel row wise convolution operation. In one aspect, the multiple CMAC systems may be grouped to perform the convolution operation on the image. The CMAC system may be utilized to perform the convolution operation in at least one of a Deep Neural Network (DNN), a Convolution Neural Network (CNN), a Recurrent Neural Network (RNN) and the like.

Figure 3:
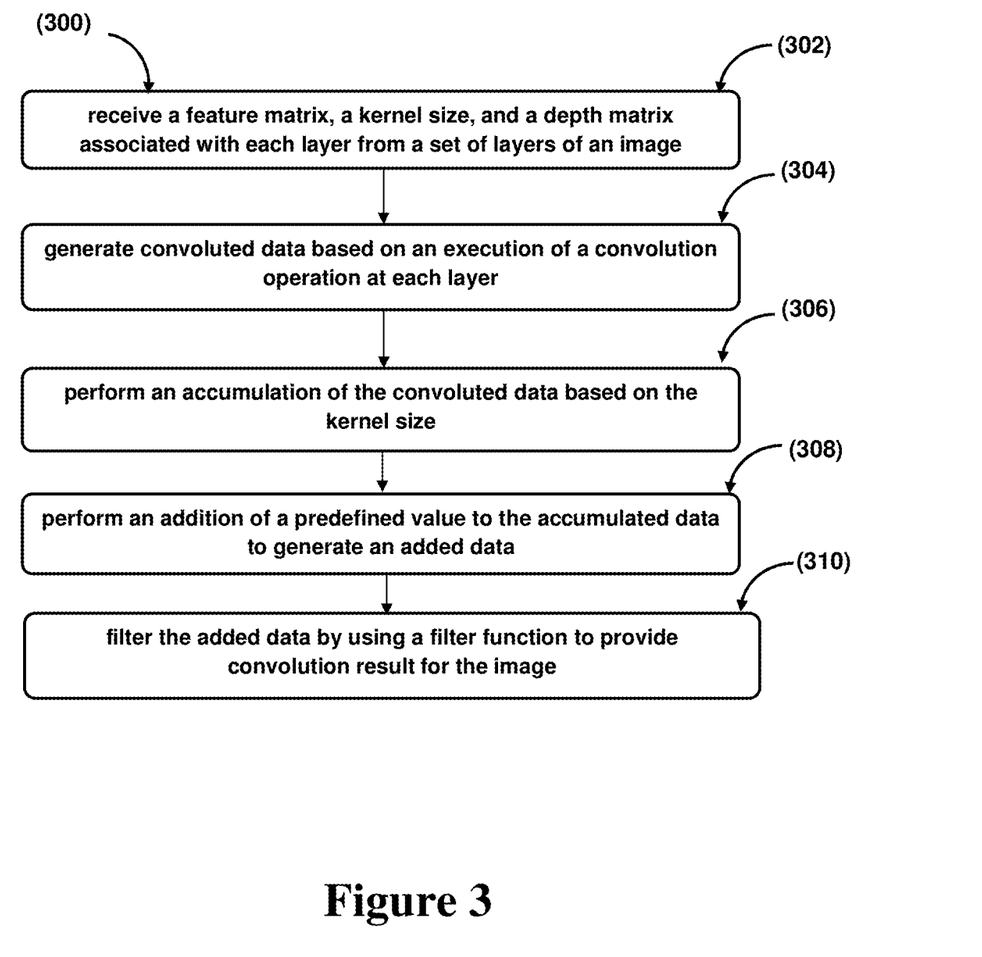
FIG. 3 illustrates a method for performing a convolution operation, in accordance with an embodiment of the present subject matter.

Referring now to FIG. 3, a method 300 for performing a convolution operation is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the reconfigurable convolution engine 102.

At block 302, image data pertaining to an image may be received. In one implementation, the local controller 208 may receive the image data. The image data may comprise a set of feature matrix, a kernel size and depth information.

At block 304, convoluted data may be generated based on execution of a convolution operation for each feature matrix. In one implementation, the Multiply and Accumulate (MAC) function 210 may generate the convoluted data. The convoluted data may be generated by multiplication of each feature, from the feature matrix, with the depth information.

At block 306, an accumulation of the convoluted data may be performed to generate accumulated data. In one implementation, the accumulator 212 may perform the accumulation of the convoluted data. The accumulation may correspond to combine the convoluted data, when the convolution operation for each feature matrix is performed.

At block 308, a predefined value may be added to the accumulated data. In one implementation, the adder 214 may add the predefined value to the accumulated data. Based on the addition of the predefined value to the accumulated data, added data may be generated.

At block 310, the added data may be filtered using a filter function. In one implementation, the activation block 216 may filter the added data to provide a convolution result for the image.

Exemplary embodiments discussed above may provide certain advantages. Though not required to practice aspects of the disclosure, these advantages may include those provided by the following features.

Some embodiments enable a system and a method enable use of multiple Convolution Multiply and Accumulate (CMAC) based on on-chip resource availability.

Some embodiments enable a system and a method to reuse same resource for one or more layer.

Some embodiments enable a system and a method to reconfigure the Convolution Multiply and Accumulate (CMAC) system based on various kernel sizes.

Although implementations for methods and systems for performing a convolution operation have been described in language specific to structural features and/or methods, it is to be understood that the appended claims are not necessarily limited to the specific features or methods described. Rather, the specific features and methods are disclosed as examples of implementations for performing a convolution operation.

The invention claimed is:

1. A Convolution Multiply and Accumulate (CMAC) system for performing a convolution operation, the CMAC system comprising:
   a local controller configured to generate a set of signals comprising a first signal, a second signal, a third signal and a fourth signal, wherein the set of signals is generated upon receipt of image data pertaining to an image, and wherein the image data comprises a set of feature matrix, depth information and a kernel size;
   a Multiply and Accumulator (MAC) configured to generate convoluted data by performing a convolution operation on each feature matrix upon receipt of the first signal, wherein the convolution operation is performed by multiplication of each feature, from the feature matrix, with the depth information;
   an accumulator configured to generate accumulated data based on accumulation of the convoluted data, when the convolution operation on each feature matrix is performed, wherein the accumulator accumulates the convoluted data upon receipt of the second signal;
   an adder configured to generate added data based on addition of a predefined value to the accumulated data upon receipt of the third signal; and
   an activation block configured to filter the added data in order to provide a convolution result for the image, wherein the activation block filters the added data by using a filter function upon receipt of the fourth signal thereby performing the convolution operation on the image, wherein the fourth signal is a parameter signal selected from a set of parameters, a bypass signal to bypass at least one of the MAC, the accumulator and the adder, or a START_RELU signal in order to receive filter function.

2. The CMAC system as claimed in claim 1, wherein the local controller is configured to store the kernel size in a local kernel buffer.

3. The CMAC system as claimed in claim 1, wherein the local controller is configured to store the set of feature matrix in a local pixel buffer.

4. The CMAC system as claimed in claim 1, further comprises multiple data ports for parallel data loading.

5. The CMAC system as claimed in claim 1, wherein the convolution operation is one of 2-dimensional convolution operation or a 3-dimensional convolution operation.

6. The CMAC system as claimed in claim 5, wherein:
   the second signal is enabled when the convolution operation corresponds to the 3-dimensional convolution operation; and
   the second signal is disabled when the convolution operation corresponds to the 2-dimensional convolution operation.

7. The CMAC system as claimed in claim 1, further comprises turning off the CMAC system upon receiving a SHUTOFF signal.

8. A method for performing a convolution operation, the method comprising steps of:
   receiving, by a processor, image data associated with an image, wherein the image data comprises a set of feature matrix, depth information and a kernel size;
   generating, by the processor, convoluted data based on execution of convolution operation for each feature matrix, wherein the convolution operation is executed by multiplication of each feature, from the feature matrix, with the depth information;
   performing, by the processor, an accumulation of the convoluted data to generate accumulated data when the convolution operation for each feature matrix is performed;
   adding, by the processor, a predefined value to the accumulated data to generate added data; and
   filtering, by the processor, the added data by using a filter function to provide a convolution result for the image, wherein the added data gets filtered by using a filter function upon receipt of a fourth signal thereby performing the convolution operation on the image, wherein the fourth signal is a parameter signal selected from a set of parameters, a bypass signal to bypass at least one of the MAC, the accumulator and the adder, or a START_RELU signal in order to receive filter function.

9. The method as claimed in claim 8, wherein the convolution operation is one of 2-dimensional convolution operation or a 3-dimensional operation.

10. The method as claimed in claim 9, wherein:
    performing the accumulation of the convoluted data is enabled when the convolution operation corresponds to the 3-dimensional convolution operation; and
    performing the accumulation of the convoluted data is disabled when the convolution operation corresponds to the 2-dimensional convolution operation.

11. A non-transitory computer readable medium embodying a program executable in a computing device for performing a convolution operation using a reconfigurable convolution engine, the program comprising a program code:
    a program code for receiving image data associated with an image, wherein the image data comprises a set of feature matrix, depth information and a kernel size;
    a program code for generating convoluted data based on execution of convolution operation for each feature matrix, wherein the convolution operation is executed by multiplication of each feature, from the feature matrix, with the depth information;

a program code for performing an accumulation of the convoluted data to generate accumulated data when the convolution operation for each feature matrix is performed;

a program code for adding a predefined value to the accumulated data to generate added data; and a program code for filtering the added data by using a filter function to provide a convolution result for the image, wherein the added data gets filtered by using a filter function upon receipt of the fourth signal thereby performing the convolution operation on the image, wherein the fourth signal is a parameter signal selected from a set of parameters, a bypass signal to bypass at least one of the MAC, the accumulator and the adder, or a START_RELU signal in order to receive filter function.

12. The non-transitory computer readable medium as claimed in claim 11, wherein the convolution operation is one of 2-dimensional convolution operation or a 3-dimensional operation.

13. The non-transitory computer readable medium as claimed in claim 12, wherein:

the program code for performing the accumulation of the convoluted data is enabled when the convolution operation corresponds to the 3-dimensional convolution operation; and the program code for performing the accumulation of the convoluted data is disabled when the convolution operation corresponds to the 2-dimensional convolution operation.

* * * * *